United States Patent [19]

Von Holdt

[11] Patent Number: 4,627,810

[45] Date of Patent: Dec. 9, 1986

[54] COLLAPSIBLE CORE

[76] Inventor: John W. Von Holdt, 6864 Lexington La., Niles, Ill. 60648

[21] Appl. No.: 781,131

[22] Filed: Sep. 26, 1985

[51] Int. Cl.$^4$ .............................................. B29C 33/02
[52] U.S. Cl. ..................................... 425/577; 249/152; 249/181; 249/184; 425/438; 425/DIG. 5; 425/DIG. 14; 425/DIG. 58
[58] Field of Search ................. 425/438, 577, DIG. 5, 425/DIG. 14, DIG. 58; 249/59, 63, 144, 152, 160, 161, 168, 180, 181, 184, 151

[56] References Cited

U.S. PATENT DOCUMENTS

| | | | |
|---|---|---|---|
| 3,642,417 | 2/1972 | Von Holdt | 425/DIG. 58 |
| 3,905,740 | 9/1975 | Lovejoy | 425/577 |
| 4,125,246 | 11/1978 | Von Holdt | 425/577 |
| 4,286,766 | 9/1981 | Von Holdt | 425/DIG. 58 |
| 4,362,291 | 12/1982 | Fuke et al. | 425/577 |
| 4,383,819 | 5/1983 | Letica | 249/160 |
| 4,533,312 | 8/1985 | Von Holdt | 425/DIG. 58 |

Primary Examiner—Jay H. Woo
Assistant Examiner—Timothy W. Heitbrink
Attorney, Agent, or Firm—Charles F. Pigott, Jr.

[57] ABSTRACT

An injection mold utilizes a collapsible core portion which includes a core portion and a mold cavity portion. A core base is provided as part of the core portion. A first mold ring is positioned about the core base and longitudinally movable to define a first annular parting line between the core base and first mold ring. The first mold ring carries outer core members and controls their longitudinal positioning along the core base while permitting them to move radially inwardly and outwardly between molding and collapsed positions. A second mold ring is carried on the core and includes stripper ring means, the second mold ring being longitudinally movable to define a second annular parting line with the first mold ring. The second mold ring also forms a third, annular parting line with the mold cavity portion. Means are provided for relatively moving the core base, mold cavity portion, and first and second mold rings in a longitudinal direction relative to each other and the mold cavity portion. Locking means may be provided for locking the parting lines closed in the molding position and to sequentially open them.

27 Claims, 7 Drawing Figures

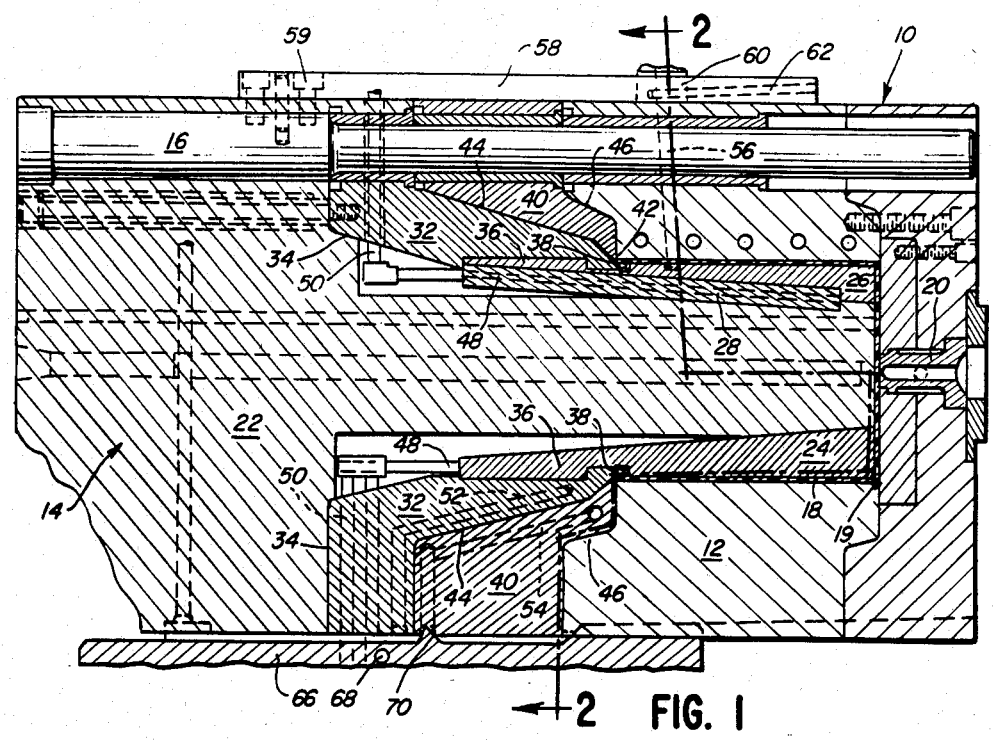
FIG. 1
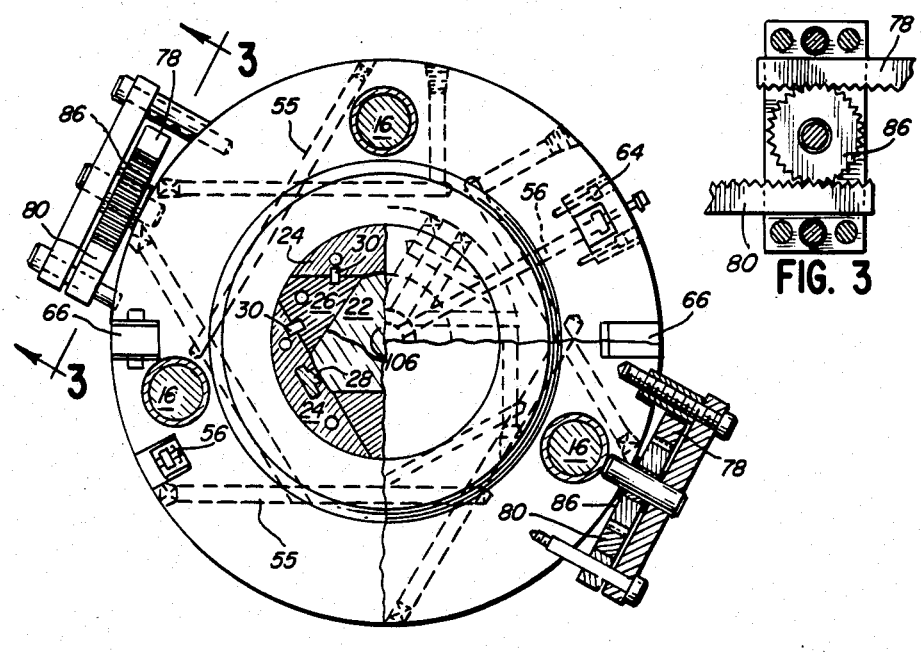
FIG. 2
FIG. 3

COLLAPSIBLE CORE

BACKGROUND OF THE INVENTION

Collapsible mold cores are generally known to the art, being typically used on molded plastic containers and the like which have undercuts in the core so that, without the core collapsing, the finished, molded piece could not be removed from the core.

Specifically, in Von Holdt U.S. Pat. No. 4,533,312, a recent design of a collapsible mold core for manufacturing straight-walled buckets and the like is shown. The collapsible mold core has members surrounding a tapered, central core member. Accordingly, as the members surrounding the central core member slide in longitudinal manner along the tapered, central core member, they also move inwardly to provide collapse of the core.

While the design of U.S. Pat. No. 4,533,312 exhibits many significant advantages, it and other designs have certain significant disadvantages that limit its use. For example, the outer core members are relatively thin and fragile, being moved between their molding and their collapsed positions by a control system which is operated from outside of the collapsible core. Because of this, when the mold sequence is for any reason out of step with itself, or a newly-molded object fails to be removed from the mold, and the mold thereafter closes, the collapsible core can be seriously damaged. For example, if the mold happens to close while the outer mold members are in their collapsed position, where they are longitudinally advanced beyond the central core member, the mold can be catastrophically destroyed.

Likewise, where side cores are used to form bucket handle attachment sites and the like, in the prior art the side cores may be operated hydraulically as a function of the molding machine, or mechanically by a cavity slide operated by the parting line opening and activating the cavity slide with an angle pin. Once again, in the event of a malfunction so that the molding steps take place out of their prescribed order and the side core is in the wrong position, severe damage can take place in the mold.

Likewise, in the prior art collapsible mold cores, when one molds a straight side container at a fast cycle, the walls of the container may show drag marks. These may be not acceptable, particularly when a smooth-sheen finish is being used for printing on the container.

Additionally, the outer mold core portions which move longitudinally relative to the central core member have been operated in the prior art by threaded side pins, which connect the outer core members to drive means outside of the core, to advance and retract the outer core members, moving them between their collapsed and molding positions. It has been found that the threaded pins sometimes break during operation of the collapsible core. The broken piece can then fall in between the respective mold halves, and cause catastrophic damage on the next closing of the mold.

The invention of this application provides a selfcontained mold having a collapsible core which provides solutions to the difficulties mentioned above, and others as well. The collapsible core of this invention eliminates many of the outside controls, to provide reliable opening and closing of the mold, with consequent collapse and reformation of the core as an automatic consequence of the mold opening and closing action. It becomes far less likely that an error by the operator, improper installation of the mold, or another mistake or failure will result in damage to the mold of this invention.

DESCRIPTION OF THE INVENTION

In this invention, an injection mold is provided having a mold cavity portion and a collapsible core portion movable between open and closed positions, and including means for defining a mold chamber between them in the closed position. Aperture means are provided as usual, permitting filling of the mold chamber with molding compound.

The core portion defines a core base, and outer core members longitudinally movable along the core base between a molding position and a collapsed position similar, for example, to the core disclosed in the previously cited U.S. patent except as otherwise indicated herein.

In accordance with this invention, the collapsible core portion also includes a first mold ring positioned about the core base and longitudinally movable to define a first annular parting line between the core base and the first mold ring. The first mold ring carries the outer core members, to control their longitudinal positioning while permitting them to move radially inwardly and outwardly between their molding and collapsed positions.

A second mold ring is carried on the core and includes stripper ring means, for pushing the molded product off of the core as the mold is opened. The second mold ring is longitudinally movable to define a second, annular parting line with the first mold ring. Also, the second mold ring moves to form a third annular parting line with the mold cavity portion.

Means are provided for relatively moving the core base, mold cavity portion, and first and second mold rings in a longitudinal direction relative to each other. Locking means are provided for locking at least the third parting line closed in the molding position, and then to sequentially open them so that, as the mold moves from the closed position to the open position, the first parting line, the third parting line, and then the second parting line are sequentially opened. Mold closing does not necessarily need to be in exactly reversed order, because the mold chamber is empty, permitting the fully expanded mold core to enter the mold cavity.

Means are also provided to cause the outer core members to move to their collapsed position as the first parting line opens, and to move again outwardly to their molding position as the first parting line closes.

Specifically, the means relatively moving the core base, mold cavity portion, and first and second mold rings longitudinally relative to each other may constitute rack and pinion means. For example, first rack means may be carried by the core base, second rack means carried by the mold cavity portion, and pinion means carried by the second mold ring. The two rack means and the pinion means may be positioned so that the pinion is placed between the two rack means and simultaneously rolls against both of them. Means may then also be provided for longitudinally moving the first mold ring, particularly a limited slide connector such as a sliding rod which connects the core base and the first mold ring. The core base thus moves alone from the mold-closed toward the mold-open position by a distance predetermined by the limited slide connector means, to open the first parting line. Thereafter, the slide connector means urges the first mold ring to move with the mold base, to open the second parting line. Other events may have taken place, prior to opening of the second parting line, to cause the third parting line to open before the second parting line, as described herein.

The phrase "open position" or "mold-open position" implies the fully open position of the mold of this invention, rather than an intermediate open position.

The stripper ring found on the second mold ring forces newly molded objects formed in the mold chamber to slide away from the outer core members as the second parting line opens.

The mold chamber may be of a bucket shape, for the purpose of molding buckets or other large containers. An annular portion of the first mold ring may define an essentially annular groove in the rims of buckets molded therein, so that the bucket product may resemble a paint can or the like.

As a part of the timing mechanism which locks and unlocks at least the third parting line, and preferably also the second parting line, a longitudinally positioned bar may be pivotally attached to a radially outward portion of the first mold ring. Pivot control means are provided to control the bar's pivotal position typically by cam action. A latch member is carried on the bar, while a latch site is carried on the second mold ring, positioned to catch said latch member in a first pivotal position of the bar. Corresponding latch means are provided between the bar and mold cavity portion.

As previously described above, one may provide means such as the limited slide connector means to cause the first mold ring to be stationary while the core base moves, to open the first parting line. When the core base opens the first parting line to a predetermined degree, the first mold ring then moves with the mold base toward the mold-open position. However, before this, the second mold ring may move by the rack and pinion means, pushing the first mold ring, to open the third parting line prior to opening of the second parting line, as described below.

The core portion and the first and second mold rings may slide between their various positions on at least three leader pins, the pins being asymmetrically arranged to preclude wrong assembly of the mold. Thus if a part is inserted in inverted form, for example, it cannot be threaded onto the leader pins. Typically, the mold cavity is stationary, and the other parts are movable, although other systems of movement may be used if desired.

As stated above, the core base carries outer core members which are longitudinally movable with respect to it. The outer core members slide longitudinally along track means carried on the core base as guided by the first mold ring. Since at least portions of the core base may be tapered, the outer core members contract inwardly as they slide longitudinally into their collapsed position, and correspondingly expand outwardly as they move back into the molding position.

The first mold ring may define an annular groove, and at least some of the outer core members may define a projection positioned to fit into the annular groove (or vice versa) whereby the outer core members are captured to move with the first mold ring. Preferably, some of the outer core members may be free of engagement with the track means of the core base, but define pin and slot retention means with other of the outer core members, so that all outer core members are tied together for common, longitudinal motion, while they are capable of collapsing inwardly and expanding outwardly as they move.

The outer core members preferably carry water cooling passages, which permit acceleration of the speed of the molding operation. The passages communicate with water flow conduits which are carried by and movable with the first mold ring. These water flow conduits in turn may be connected to a hose extending outside of the mold core. This obviates a prior problem in which water flow conduits were stressed by the movement of the mold parts and would often crack. The present system eliminates that problem.

As another safety advantage, in the open position, the outer core members may be longitudinally spaced from the mold cavity portion by at least the corresponding spacing of the second mold ring from the mold cavity portion, to protect the outer core members in the event of inadvertent mold closure when the prior molded article has not been removed. Basically, if the outer core members are at least as far away from the mold cavity portion as the second mold ring, if an inadvertent mold closure takes place before removing the prior molded article, the second mold ring will tend to strike the molded article or mold cavity portion to absorb the shock, rather than the outer core members. The second mold ring may be relatively sturdy in construction, while the outer core members are relatively fragile. Thus, the risk of damage to the mold by such an unplanned but not unknown event is greatly reduced.

If it is desired to provide side action to the mold to form apertures in the side of molded containers for bail handles or the like, at least one and preferably two diametrically opposed pull bars are carried on a side surface by the core base. Each pull bar extends longitudinally along the side of the mold. A side mounted molding member, such as rods to define opposed apertures in buckets molded therein, extends laterally into the mold cavity portion, being laterally movable between a retracted position to permit opening of the mold and an inwardly advanced position in which a portion of the side-mounted molding member forms a portion of the mold chamber to help define its shape.

The pull bar may define a T-slot, and the side-mounted molding member may carry a slide member positionable within the T-slot. The T-slot extends generally longitudinally, but also is laterally inclined, i.e., radially inclined in the case of cylindrical mold systems as shown in this specific embodiment herein.

In the closed position of the mold cavity portion and core portion, the side-mounted molding member is in its advanced position. Prior to the opening of the third parting line on opening of the mold (i.e., while the first parting line is being initially opened) the side-mounted molding member is moved along the T-slot, which forces it into its outer, retracted position. On closing, the reverse takes place, to provide a reliable side action system.

Upon opening of the first parting line, the mold core of this invention begins to collapse, moving away from the inner walls of the newly molded item in the mold chamber. At the same time, the side-mounted member is withdrawn as described above. Because of the withdrawing of the collapsible core, the freshly molded bucket is able to shrink in a predetermined manner, causing its outer surfaces to draw out of engagement with the mold cavity. Thus, a smooth-finish bucket, without scratches, can be easily pushed out of the mold of this invention, to provide a fine surface finish on the bucket, free of surface defects.

The mold of this invention, while shown in a cylindrical embodiment, may define a mold chamber which is rectangular or oval in cross section, if desired, or of many other possible shapes.

As a further advantage, with the mechanical synchronizing of the opening of the respective parting lines, interference can not occur between the side-mounting molding member and the outer core members. This condition is an inherent characteristic of the opening and closing action of the mold of this invention, dictated by relatively simple mechanical means.

Accordingly, the mold of this invention provides internal mechanical control of many of its functions so that the respective parts work reliably together without outside intervention, contrary to the prior art where side core functions, outer core member functions, and the like were operated by apparatus external to the mold core and cavity. Accordingly, the risk of severe damage to the mold by an accidental failure to get the sequence of mold operating steps ring is greatly reduced.

DESCRIPTION OF THE DRAWINGS

In the drawings,

FIG. 1 is a longitudinal sectional view of one embodiment of the mold of this invention, the lower half of the view being a sectional plane defining an angle of degrees to the plane of the upper half of the view.

FIG. 2 is a sectional view taken along line 2—2 of Fig. 1.

FIG. 3 is a fragmentary sectional view taken along line 3—3 of FIG. 2.

DESCRIPTION OF SPECIFIC EMBODIMENT

Figure 7:
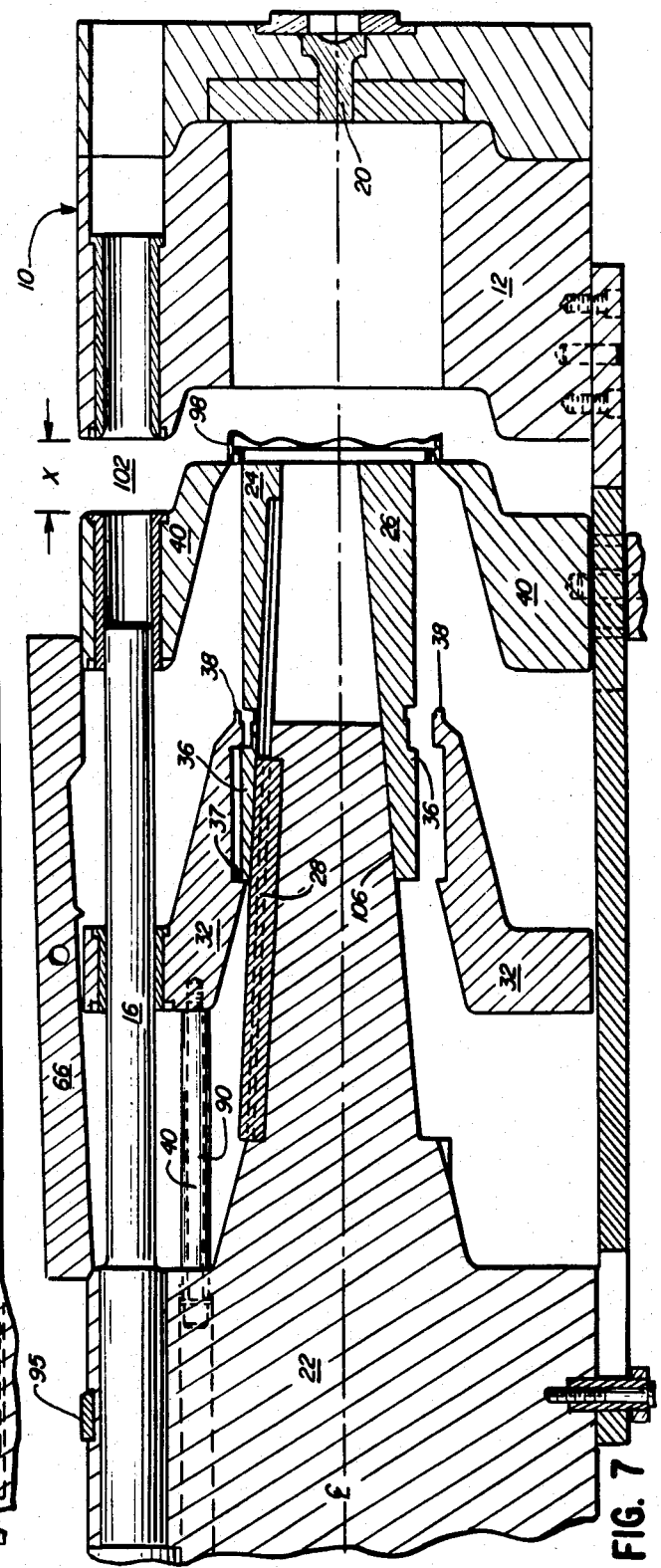
FIG. 7 is a longitudinal sectional view of the mold of this invention, showing the mold in its fully opened configuration.

Referring to the drawings, an injection mold 10 is disclosed, having a mold cavity portion 12 and a collapsible core portion 14, which are movable by conventional means upon leader pins 16 between an open position as shown in FIG. 7, for example, and a closed position as shown in FIG. 1. Injection mold 10 defines mold chamber 18, which is of the shape to define a molded bucket, and sprue means 20 to permit filling of mold chamber 18 with molding compound. Annular groove 19 provides a lower end ring on the molded buckets, to help protect the outer finish of the bucket.

Core portion 14 defines a core base 22, which is longitudinally movable along pins 16 relative to mold cavity 12. Core base 22 carries a plurality of outer core members 24, 26, which are substantially of the construction and function of the outer core members of Von Holt U.S. Pat. No. 4,533,312, except as otherwise described herein. Outer core members 24, 26 are longitudinally slidable on core base 22, with larger outer core members 26 sliding in T slot 28, and smaller core members 24 being slidingly latched by sliding pin members 30, to be locked with outer core members 26 in their longitudinal sliding motion, but to permit radially inward collapsing motion during said longitudinal sliding.

Collapsible core portion 14 also includes first mold ring 32, which is positioned about core base 22 to define a first, annular parting line 34 between core base 22 and mold ring 32. Outer core members 24, 26 each define projections 36 which fit into a corresponding annular slot of first mold ring 32 as shown, so that first mold ring 32 retains and controls the longitudinal motion and position of outer core members 24, 26 as they slide together back and forth along core base 22. Also, first mold ring 32 defines annular projection 38, which serves to define a groove in the rim of buckets formed in the molding chamber 18, so that plastic buckets of the structure of a paint can may be manufactured by the mold of this invention.

Second mold ring 40 is also provided, being carried on said core base and including stripper ring 42, which stripper ring engages the outer lip of the bucket or other object formed in mold chamber 18, to assist in removal of the molded, solidified objects from the mold core when the injection mold is open.

Second mold ring 40 is longitudinally movable to define a second, annular parting line 44 with first mold ring 32. Second mold ring 40 also defines a third, annular parting line 46 with mold cavity 12.

Cooling water passages 48 are provided within outer mold members 24 and 26. These passages 48 communicate with water conduits 50 which are carried by and movable with first mold ring 32. Accordingly, even though the outer mold members 24, 26 are movable, they can be supplied with cooling water without breakage of passages 48, 50 as the parts move. Similarly, water passages 52, 54 may be provided for cooling mold rings 32, 40.

Other water passages 55 may be provided to the mold core and cavity portions in accordance with conventional design.

A side mounted molding member constituting radially positioned rod 56 is provided. Typically a pair of them are present in opposed relation to each other in order to provide a side action to the mold, in this case to provide apertures in buckets molded in mold chamber 18 into which a handle may be inserted. Other types of side action may be used as well.

As the mold opens it is of course necessary to move rod 56 from its advanced, molding position to a retracted position, where it is pulled out so that outer core members 24, 26 may move from their molding position to a collapsed position.

As injection mold 10 opens, the first motion is the withdrawal of core base 22, to open the first parting line 34, while first and second mold rings 32, 40 remain stationary with respect to cavity portion 12. As core base 22 moves, side core pull bar 58 moves as well, being attached to core base 22 by bolts 59. Side mounted molding member 56 carries slide member 60, part of which is adapted to slide in T slot 62, positioned within pull bar 58. T slot 62 extends generally longitudinally, but it is also radially inclined, as shown in FIG. 1.

Accordingly, as core base 22 and pull bar 58 move toward the left (from the viewpoint of FIG. 1) to begin the mold opening process, slide member 60 will be forced to move outwardly as T slot 62 moves past it, causing the withdrawal of molding pin 56. Thus, the withdrawal of core base 22 results in the outward withdrawal of pins 56 before outer core members 24, 26 have to move.

Bridge members 64 may be provided to strengthen and stabilize the system for pulling side mounted mold pins 56 as the mold opens, and then to advance them again as the mold closes.

Core base 22 may be operated by a conventional mold opening and closing device positioned outside the mold, if desired, with core base 22 sliding on leader pins 16.

For added control of mold opening, locking means are provided for the second and third parting lines, which includes a longitudinally positioned timer bar 66, and generally an opposed pair of them, to assist in timing of the opening of respective parting lines. Timer bar 66 is pivotally mounted at pivot 68 (FIG. 4) on an outer portion of first mold ring 32. Bar 66 defines latch member 70, which can fit in locking relation into latch site 72, being a slot or notch carried on second mold ring 40, when bar 66 is in a first pivotal position. Latch surface 74 engages projection 96, to cause locking of third parting line 46 in one angular position, and to release it in another. In this position, second parting line 44 is also locked.

Bar 66 may also define a camming surface 76 to change its angular position when the bar disengages pad 95.

For control of the longitudinal position of the respective parts of the mold, rack and pinion means are used in the longitudinal movement and positioning of the mold cavity portion, collapsible core portion, and first and second mold rings. However, in this particular embodiment, second mold ring 40 is not directly controlled by the rack and pinion means.

More specifically, geared rack 78 (FIG. 4) is affixed to cavity portion 12, while geared rack 80 is slidingly carried on core base 22, with pin 82 of core base 22 being slidingly retained in slot 84. Pinion gear 86 is pivotally carried on second mold ring 40 by axle 88. It can be seen the pinion 86 rolls on both racks 78, 80, so that as pinion 86 rolls, the two racks necessarily move relative to pinion 86 in precisely controlled, opposed directions, depending upon the direction of roll of pinion 86 (actually rack 78 is stationary, and pinion 86 moves at one half the speed of rack 80).

A limited slide connector rod 90, carried by first mold ring 32, is positioned to pass through the first parting line 34 into an interior bore 91 of core base 22. Stop means are provided, namely annular shoulder 92 of bore 92, and outwardly projecting ring 94 of rod 90, so that the sliding motion of rod 90 is limited, and the maximum space between core base 22 and first mold ring 32 is limited by the limited slide means 90, 92, 94, etc.

The three leader pins 16 (FIG. 2) upon which core base 22 and mold rings 32, 40 slide may be arranged in asymmetric manner as shown. Their positioning is not quite that of an equilateral triangle. It is not possible to assemble the mold with one of the mold rings inverted. Thus wrong assembly is precluded.

Figure 4:
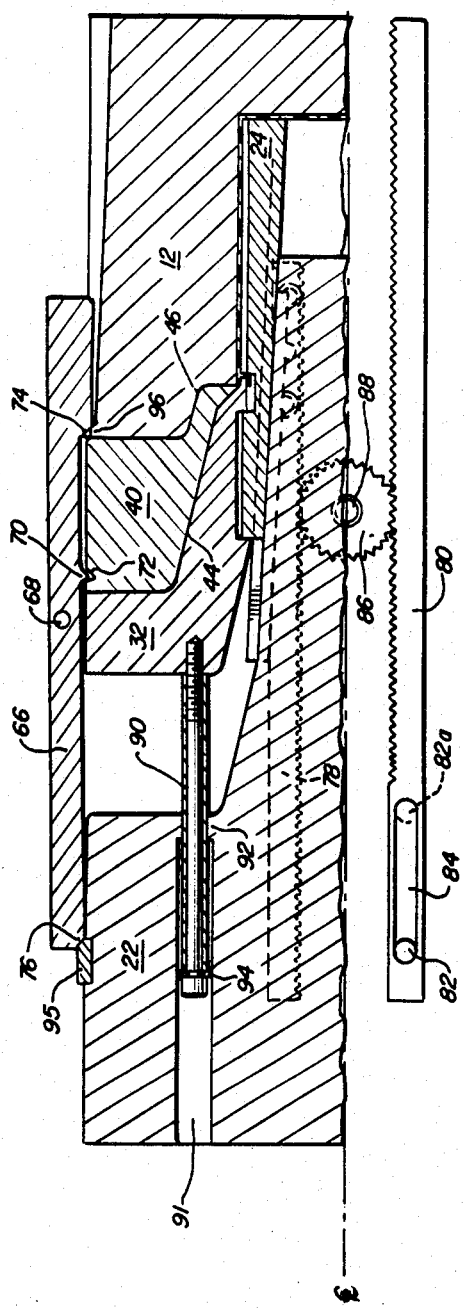
FIG. 4 is a longitudinal sectional view of one longitudinal half of the mold of FIG. 1, and showing the mold in a first stage of opening.

Turning now to the functioning of the device of this invention, to open mold 10, core base 22 is moved by conventional means along leader pins 16, away from cavity portion 12 by conventional mold opening drive means from the position of FIG. 2 to that of FIG. 4. In this first step of mold opening, rack 80 does not move because of the presence of slot 84. Instead, pin 82 moves in slot 84 from its original position 82a at one end of slot 84 to its position as shown in full lines in FIG. 4.

At this point it can be seen that camming surface 76 of timing bar 66 falls off of projecting cam pad 95 on the top of core base 22. This causes timer bar 66 to rotate in counter clockwise manner, so that latch surface 74 is lifted off of projection 96 of core portion 12. Thus, second mold ring 40 becomes unlocked and capable of movement, whereas, during the molding cycle, it was locked to facilitate tight retention of second mold ring 40 against cavity portion 12, to avoid leakage of molding compound through third parting line 46.

Simultaneously, it can be seen that the outer core member 24, 26 slide inwardly, in a manner of the similar action of previously cited U.S. Pat. No. 4,533,312, as core base 22 withdraws.

Thus, as shown in FIG. 4, the first parting line 34 has been opened.

Figure 5:
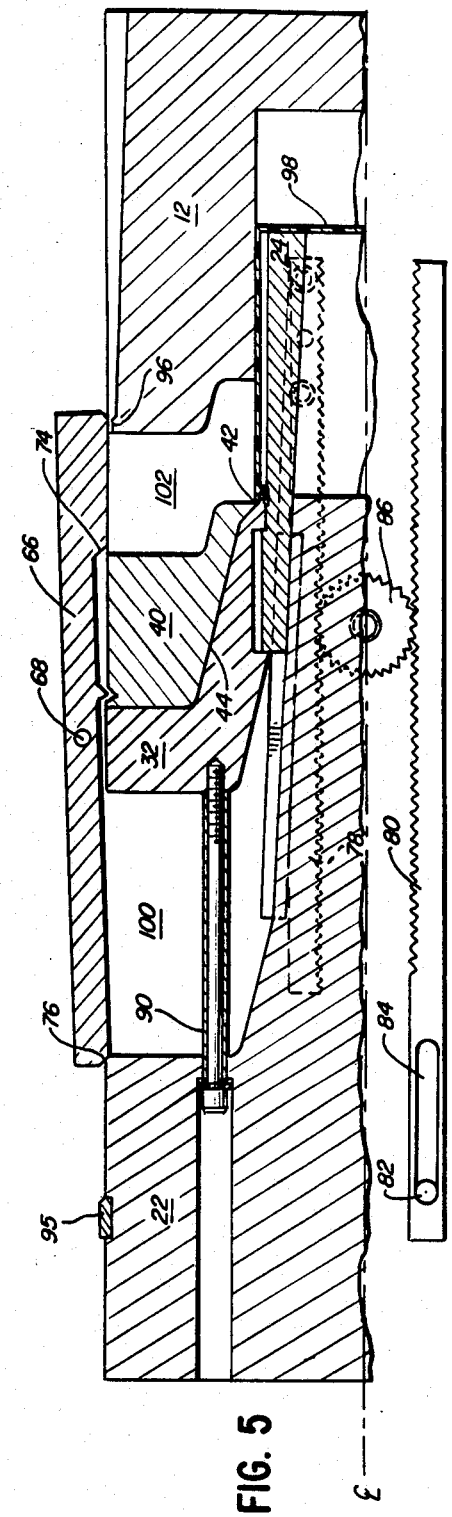
FIG. 5 is a longitudinal sectional view similar to Fig. 4, showing the mold in a second stage of opening.

As shown in FIG. 5, core base 22 continues to withdraw, sliding outwardly along leader pins 16. In the motion that takes place between FIGS. 4 and 5, rack 80 is now pulled outwardly along with core base 22, since pin 82 has encountered the outer end of slot 84 in the position of Fig. 4. This, of course, causes pinion gear 86 to move outwardly as well, rotating as it moves, and taking attached second mold ring 40 with it. The effect of this is to open third parting line 46 between second mold ring 40 and core base 12, while second parting line 44 remains closed. First mold ring 52 and the retained outer core segments 24, 26 are pushed by second mold ring 40 away from cavity member 12. This will generally also cause the withdrawal of freshly molded bucket 98 along without core segments 24, 26.

It should be noted that, as an inherent function of the rack and gear system, during the motion between the positions of FIGS. 4 and 5, core base 22 will be withdrawing twice as fast as first and second mold rings 32, 40 by the natural rack and pinion motion. Thus space 100, between core base 22 and first mold ring 32, keeps increasing at a precisely predetermined rate, when compared with space 102 between second mold ring 40 and cavity portion 12.

Figure 6:
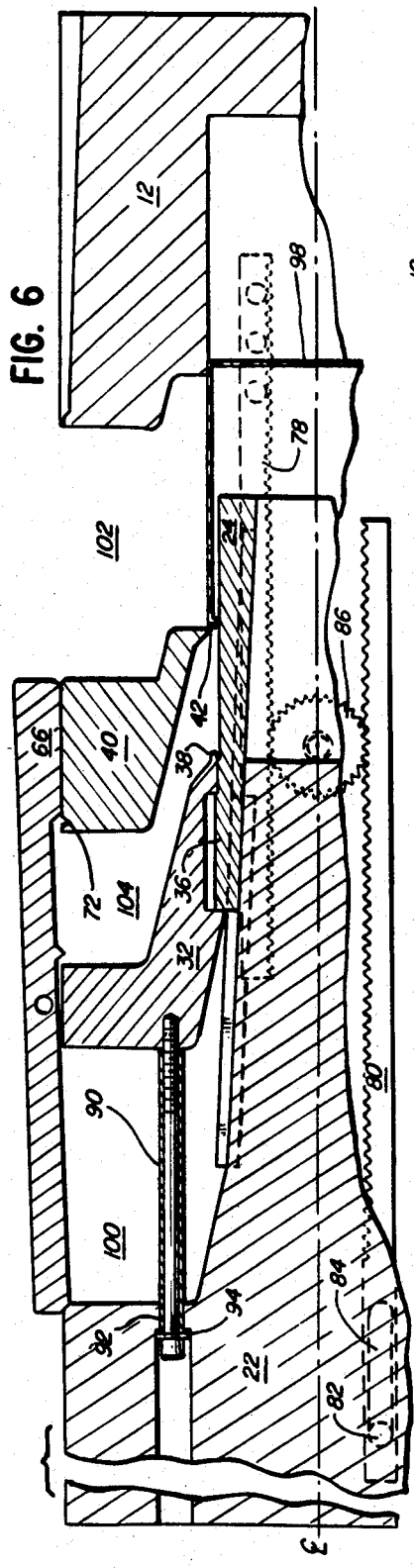
FIG. 6 is a longitudinal sectional view similar to Fig. 4, showing the mold in a third stage of opening.

Turning now also to FIG. 6, a further step in the opening process is shown. In the opening motion which takes place between the positions of FIGS. 5 and 6, core base 22 has advanced so that projecting ring 94 of limited slide connecting rod 90 enters into engagement with annular shoulder 92. From this point on, core base 22 cannot increase its distance from mold ring 32, but rather, mold ring 32 must from then on follow the opening core base 22. Accordingly, second parting line 44 opens, to form space 104 between first and second mold rings 32, 40. As this takes place, outer core members 24, 26 are with drawn along with first mold ring 32 until, preferably, the point is reached as shown in FIG. 7 at which outer core members 24, 26 withdraw within second mold ring 40.

During all this time, from the beginning of the formation of space 102, stripper ring 42 on the inner end of second mold ring 40, has been forcing bucket 98 to be left behind as outer core members 24, 26 withdraw. As outer core members 24, 26 withdraw within second mold ring 40, bucket 98 is freed from all engagement with mold parts, and can drop away through the large space 102. It should be understood that space 102 is greatly foreshortened for purposes of economy of presentation in FIGS. 7, but is of a distance X which is wide enough to allow bucket 98 to drop through the space and out of injection mold 10.

It can also be seen that as outer core members 24, 26 are retracted, the smaller of the core members 26 move radially inwardly along flat faces 106 of core base 22, which are angled inwardly to a greater degree than the angle of the T slots 28, to achieve the characteristic inner core collapse described in previously cited U.S. Pat. No. 4,533,312. In so doing, outer core members 26 come out of engagement with projection 36 of first mold ring 32. However, since outer core members 24 do not completely lose their engagement between projection 36 and step 37, all the outer members are still controllable, since they are tied together by sliding pins 30, which cause common longitudinal motion of outer core members 24, 26, while permitting individual lateral or radial motion.

On closing of the mold, the same steps do not necessarily take place in reverse order. Core base 22 and second mold ring 40, being rack and pinion controlled, close in the same pattern. First mold ring 32 will generally be motionless until first parting line 30 closes. Then it advances with core base 22 into closed position.

It can be seen that the opening and closing steps are all governed to take place in automatic, mechanical manner so that human error can be to a large extent eliminated as a likely factor in the breakdown or other function of the mold.

To recapitulate, upon mold opening, core base 22 opens first, spontaneously causing side mounted molding member 56 to be withdrawn as it opens. Likewise, timer bar 66 is rotated out of its first position which locks second and third parting lines 46, to rotate into an unlocking position when bar 66 separates from pad 95 on core base 22. Simultaneously, pin 82 of core base 22 comes to the end of slot 84, and begins to withdraw rack 80, which causes pinion gear 86 to rotate. From that moment on, third parting line 46 begins to open, causing first and second mold rings 32, 40 and outer core members 24, 26, which in the meanwhile have sunk inwardly, to begin withdrawing. Nevertheless, core base 22 continues outwardly at a faster pace than the latter portions. Thereafter, connector rod 90 comes to the end of its limited slide, and begins to open second parting line 44. This finishes the withdrawal of outer core members 24, 46 from molded bucket 98.

Because of the presence of the rack and pinion means 78, 80, 86 the amount of withdrawal of respective parts is critically controlled, so that they roll back together with precisely controlled movement. Upon the closing of timer bar 66, if falls back into its latched position, and the mold of this invention assumes the molding configuration of FIG. 1 once again.

The above has been offered for illustrative purposes only, and is not intended to limit the scope of the invention, which is defined in the claims below.

That which is claimed is:

1. In an injection mold having a mold cavity portion and a collapsible core portion, said mold cavity portion and collapsible core portion being movable between open and closed positions, and including means for defining a mold chamber between said mold cavity portion and collapsible core portion in the closed position, plus aperture means permitting filling of the mold chamber with molding compound, said core portion defining a core base, and outer core members longitudinally movable along said core base between a molding position and a collapsed position, the improvement comprising, in combination:

said collapsible core portion also including a first mold ring positioned about said core base, said first mold ring being longitudinally movable to define a first, annular parting line between said core base and first mold ring, said first mold ring carrying said outer core members to control the longitudinal positioning of said outer core members while permitting said outer core members to move radially inwardly and outwardly between molding and collapsed positions; a second mold ring carried on said collapsible core portion, said second mold ring including stripper ring means, said second mold ring being longitudinally movable to define a second, annular parting line with said first mold ring, said second mold ring also forming a third, annular parting line with the mold cavity portion; means for relatively moving said core base, mold cavity portion, and first and second mold rings in a longitudinal direction relative to each other; and locking means for locking at least said third parting line closed in the molding position and to sequentially open said parting lines, whereby, as the mold moves from the closed position to the open position, the first parting line, the third parting line, and then the second parting line are sequentially opened, and means to cause said outer core members to move to a collapsed position as the first parting line opens, and to cause said outer core members to move again outwardly to a molding position as the first parting line closes.

2. The injection mold of claim 1 in which said stripper ring means forces newly molded objects formed in the mold chamber to slide away from the outer core members as the second parting line opens.

3. The injection mold of claim 1 in which the mold chamber is of a bucket shape, and an annular portion of the first mold ring defines an essentially annular groove in the rims of buckets molded therein.

4. The injection mold of claim 1 in which said locking means includes a longitudinally positioned bar pivotally attached to a radially outward portion of said first mold ring; pivot control means to control the bar's pivotal position; latch member means carried on said bar, said second mold ring, and said cavity portion which is positioned to lock said third parting line in a first pivotal position of the bar; cam means for moving the bar to a second pivotal position to cause the latch member means to open when the first parting line has opened a predetermined amount.

5. The injection mold of claim 1 in which said collapsible core portion, first and second mold rings, and said mold cavity portion slide between their various positions on at least three leader pins, said pins being asymmetrically arranged to preclude wrong assembly of the mold.

6. The injection mold of claim 1 in which said outer core members slide longitudinally along track means, said track means being carried on said core base as guided by said first mold ring.

7. The injection mold of claim 6 in which said first mold ring defines an annular groove, and at least some of said outer core members define a projection positioned to fit into said annular groove, whereby said outer core members are captured to move with said first ring.

8. The injection mold of claim 7 in which some of said outer core members are free of engagement with said track means, said outer core members also defining pin and slot retention means with other of said outer core members, whereby all outer core members are tied together for common longitudinal motion.

9. The injection mold of claim 1 in which at least one pull bar is carried on a side surface of said core base, said pull bar extending longitudinally along a side of said mold; a side-mounted molding member extending laterally through said mold cavity portion, said side-mounted molding member being laterally movable between a retracted position and an inwardly advanced position in which an inner portion of said side-mounted molding member forms a portion of the mold chamber to help define the shape of said mold chamber; said pull bar defining a T slot, and said side-mounted molding member carrying a slide member positionable within said T slot, said T slot extending generally longitudinally, but also laterally inclined, whereby, in the closed position of the mold cavity portion and collapsible core portion, the side-mounted molding member is in an advanced position, and prior to the opening of the third parting line on opening of the mold, the side-mounted molding member is moved along said T slot into a retracted position.

10. The injection mold of claim 1 in which limited slide connector rod means connects said core base to the first mold ring, whereby said core base moves from the closed position toward the open position by a distance predetermined by said limited slide connector rod means before causing the first mold ring to move.

11. The injection mold of claim 1 in which said outer core members carry water cooling passages, said water cooling passages communicating with water flow conduits, said water flow conduits being carried by and movable with said first mold ring.

12. The injection mold of claim 1 in which, in the open position, said outer core members are longitudinally spaced from said mold cavity portion by at least the spacing in the open position of the second mold ring from the mold cavity portion, to protect the outer core members in the event of inadvertent mold closure.

13. The injection mold of claim 1 in which rack and pinion means are used in the longitudinal movement and positioning of the mold cavity portion, collapsible core portion, and said first and second mold rings.

14. In an injection mold having a mold cavity portion and a collapsible core portion, said mold cavity portion and collapsible core portion being longitudinally movable between open and closed positions, and including means for defining a mold chamber between said mold cavity portion and collapsible core portion in the closed position, plus aperture means permitting filling of the mold chamber with molding compound, said core portion defining a core base having tapered side portions, and outer core members longitudinally movable along said core base between a molding position and a collapsed position, and the improvement comprising, in combination:

said collapsible core portion also including a first mold ring positioned about said core base, said first mold ring being longitudinally movable to define a first, annular parting line between said core base and first mold ring, said first mold ring carrying said outer core members to control the longitudinal position of said outer core members, but permitting said outer core members to move radially inwardly and outwardly between molding and collapsed positions while moving along said tapered core base; a second mold ring carried on said collapsible core portion, said second mold ring including stripper ring means, said second mold ring being longitudinally movable to define a second, annular parting line with said first mold ring, said second mold ring also forming a third, annular parting line with the mold cavity portion; first rack means carried by said core base; second rack means carried by said mold cavity portion; and pinion means carried by said second mold ring, said first and second rack means and pinion means being positioned so that the pinion means is placed between the first and second rack means, said pinion means simultaneously rolling against both of said first and second rack means; means for longitudinally moving said first mold ring; and means to sequentially open said first, second, and third annular parting lines, whereby, as the mold moves from the closed position to the open position, the first parting line, the third parting line, and then the second parting line are sequentially opened; and means to cause the outer mold members to collapse inwardly to the collapsed positioned as the first parting line opens and to cause said outer core members to move again outwardly into a molding position as the first parting line closes.

15. The injection mold of claim 14 including a longitudinally positioned bar pivotally attached to a radially outward portion of said first mold ring; pivot control means to control the bar's pivotal position; latch means carried on said bar, second mold ring, and said cavity portion, said latch means being positioned to latch said third parting line in a first pivotal position of the bar; and cam means for moving the bar to a second pivotal position to cause the latch means to open when the first parting line has opened a predetermined amount.

16. The injection mold of claim 15 in which limited slide connector rod means connects said core base to the first mold ring, whereby said core base moves from the closed position toward the open position by a distance predetermined by said limited slide connector rod means before causing the first mold ring to move.

17. The injection mold of claim 16 in which said outer core members carry water cooling passages, said water cooling passages communicating with water flow conduit means, said water flow conduits being carried by and movable with said first mold ring.

18. The injection mold of claim 17 in which said outer core members slide longitudinally along track means, said track means being carried on said core base, as guided by said first mold ring.

19. The injection mold of claim 18 in which said first mold ring defines an annular groove, and at least some of said outer core members define a projection positioned to fit into said annular groove, whereby said outer core members are captured to move with said first mold ring.

20. The injection mold of claim 19 in which the mold chamber is of a bucket shape, and an annular projection of the first mold ring defines an essentially annular groove in the rims of buckets molded therein.

21. The injection mold of claim 20 in which one of said mold cavity portion and core base is connected to its respective rack means in limited, longitudinal, sliding relation, whereby one of said one mold cavity portion and core base may move along a predetermined distance and then begin to move its respective connected rack.

22. The injection mold of claim 21 in which said stripper ring means forces newly molded objects formed in the mold chamber to slide away from the outer core members as the second parting line opens.

23. The injection mold of claim 22 in which at least one pull bar is carried on a side surface of said core base, said pull bar extending longitudinally along a side of said mold; a sidemounted molding member extending laterally through said mold cavity portion said sidemounted molding member being laterally movable between a retracted position and an inwardly advanced position in which an inner portion of said side-mounted molding member forms a portion of the mold chamber to help define the shape of the mold chamber; said pull bar defining a T slot, and said side-mounted molding member carrying a slide member positionable within said T slot into the retracted position.

24. The injection mold of claim 23 in which, in the open position, said outer core members are longitudinally spaced from said mold cavity portion by at least the spacing in the open position of the second mold ring from the mold cavity portion, to protect the outer core members in the event of inadvertent mold closure.

25. The injection mold of claim 24 in which said collapsible core portion, first and second mold rings, and said mold cavity portion slide between their various positions on at least three leader pins, said pins being asymmetrically arranged to preclude wrong assembly of the mold.

26. The injection mold of claim 25 in which some of said outer core members are free of engagement with said track means carried on the core base, and the same outer core members define pin and slot retention means with other of said outer core members, whereby all outer core members are tied together for common longitudinal motion.

27. In a mold having more than two movable separable portions said movable, separable portions defining a plurality of parting lines, the improvement comprising, in combination:
  a longitudinally positioned bar pivotally attached to one of said movable, separable portions; first cam means carried on at least one other of said movable, separable portions said cam means being positioned to engage and hold said bar in a first predetermined angular position; latch member means carried on said bar and latch sites carried on two of said other separable portions, said latch member means and latch sites being positioned to lock together to prevent separation of two of said separable portions while the bar is in the first predetermined angular position, to lock at least one of the parting lines, and second means for causing said bar to pivot to another angular position, as the movable, separable portions move to another predetermined position, in which the latch member means and latch sites can separate, whereby said one parting line can be automatically opened later than at least one other parting line by moving said movable, separable portions.

* * * * *